Figure 1:
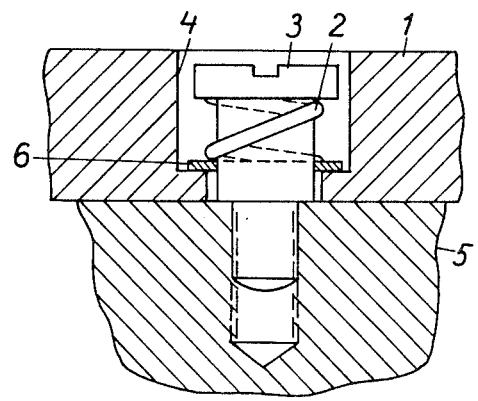

United States Patent [19]

Hesselgren

[11] 4,012,030
[45] Mar. 15, 1977

[54] FIXTURE FOR PRECISION POSITIONING OF WORK PIECES

[75] Inventor: Tore Gottfrid Hesselgren, Johanneshov, Sweden

[73] Assignee: Telefonaktiebolaget L M Ericsson, Stockholm, Sweden

[22] Filed: Sept. 10, 1975

[21] Appl. No.: 612,259

[30] Foreign Application Priority Data

Sept. 20, 1974 Sweden .............................. 7411857

[52] U.S. Cl. .................................. 269/60; 269/71; 269/101; 269/234; 408/91
[51] Int. Cl.² ......................................... B23Q 1/04
[58] Field of Search ............... 408/115, 91; 269/55, 269/71, 60, 101, 234, 310, 321 A

[56] References Cited

UNITED STATES PATENTS

| | | | |
|---|---|---|---|
| 2,830,476 | 4/1958 | Zapf | 269/310 |
| 2,860,532 | 11/1958 | Zickafoose | 408/91 |
| 3,744,902 | 7/1973 | Henker | 408/91 |

*Primary Examiner*—Al Lawrence Smith
*Assistant Examiner*—Robert C. Watson
*Attorney, Agent, or Firm*—Hane, Sullivan & Spiecens

[57] ABSTRACT

A fixture for holding of work pieces on a work table of a machine tool and for precision positioning of the work pieces in rotation and in translation. The fixture is held by springs pressing it against the work table and is thus floating on the work table but is adjustable in two directions relative to the table and rotatable relative thereto.

4 Claims, 2 Drawing Figures

FIXTURE FOR PRECISION POSITIONING OF WORK PIECES

The present invention refers to a fixture for holding of work pieces on an adjustable work table of a machine tool and for precision positioning of the work pieces for their maching in the machine tool.

At for example drilling machines there are work tables which are movable into two directions normal relation to each other. It occurs that several work pieces are attached to the same work table and that all these work pieces are to be drilled with holes in the same pattern. In such cases the work table is often provided with separate fixtures for holding of the different work pieces. The drilling machine can also be provided with several spindles, one for each fixture. The fixtures on the work table must be positioned precisely so that the drilled holes on each work piece gets the same position. This precision positioning of the fixtures is very time-wasting with the arrangements hitherto known. At precision positioning with known arrangements a fixture is loosened from the work table, moved into the desired direction by careful tapping, fixed to the work table and its position is measured. The procedure is repeated several times until the fixture has obtained the desired position. All the fixtures are precision positioned in the same manner. When for example printed circuit boards are to be drilled a maximum error of 0.01 mm in the position of the holes is allowed; the precision positioning of four fixtures on a drilling machine for such a purpose may take a whole working day.

The purpose of the fixture according to the present invention is that the precision positioning of it is to be carried out easier and faster than with fixtures hitherto known so that the time consumption for the positioning is reduced considerably. This object is obtained thus that each separate fixture is floating, i.e. it is pressed against the work table by a number of springs and not fixed to the work table with fixing screws. Furthermore the fixture is pressed by counter springs against arrangements for precision positioning in rotation and in translation in two directions. The arrangements for precision positioning can be locked after positioning. When measuring the real positioning of the fixture inductive transducers are used which are known per se. With the arrangements according to the invention is achieved that each fixture on the work table of the drilling machine in an easy manner and in a considerably shorter time than before can be given a measurable, well defined translation to a position which places the work piece in the intended hole positions. It is furthermore achieved that the fixture is more firmly held in the intended position than before, whereby more work pieces than before can be drilled between each precision positioning.

Figure 2:
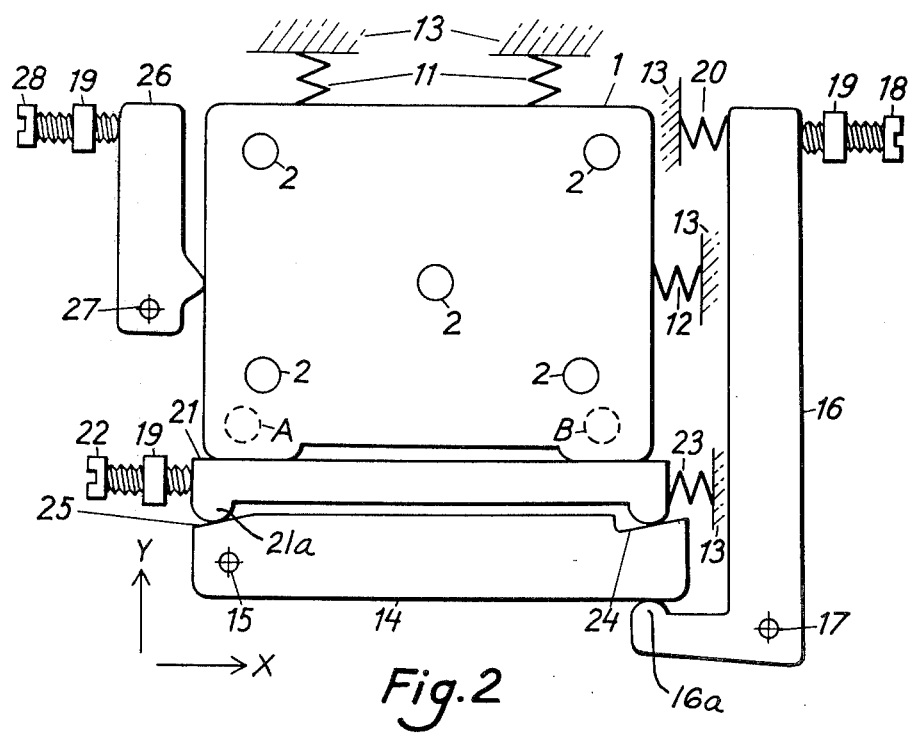

In the following is described an example of a fixture according to the invention with reference to the enclosed drawing where FIG. 1 shows a pressure spring which presses the fixture against the work table, and FIG. 2 shows in principle the fixture and its positioning arrangements.

The fixture 1 is provided with a number of springs 2, one of which is shown in FIG. 1. The spring 2 is in the shape of a helix spring and is guided by a bolt 3 which is fitted in a hole 4 in the fixture 1 and screwed in the work table 5. Via an intermediate washer 6 the spring 2 presses the fixture 1 against the work table 5.

The fixture 1 has such a large clearance hole around the bolt 3 that translation of the fixture along the work table 5 for precision positioning is possible.

The fixture 1 in the example is provided with five springs 2, as is indicated in FIG. 2. The fixture is pressed by counter springs 11 in a direction called Y-direction against one part of the arrangements for precision positioning and by one further counter spring 12 pressed in X-direction against another part of the arrangements for precision positioning. The reaction force of the counter springs is sustained by the supports 13 which are fixed to the work table of the drilling machine.

For the precision positioning of the fixture 1 in rotation in relation to the work table a pivotal bar or ruler 14 is arranged. This ruler is pivoting round a pivot pin 15 fixed to the work table and is controlled by a first lever 16 which is pivoting about a pivot pin 17 arranged on the work table and in turn controlled by a positioning screw 18. The positioning screw 18 is threaded through a stud 19 fixed to the work table. A reset spring 20 is arranged for continual pressing of the lever 16 against the first positioning screw 18. The lever 16 is arranged for a shorter movement at the ruler 14 than at the first positioning screw 18.

For positioning of the fixture 1 in the Y-direction in relation to the work table a sliding bar or ruler 21 is arranged, which is pressed between an edge on the fixture 1 by the action of the springs 11 and two wedges 24, 25 on said ruler 14. The ruler 14 is the earlier described pivotal ruler, but when describing the precision positioning of the fixture in Y-direction the pivoting of the ruler 14 can be disregarded and instead the ruler can be regarded as fixed to the work table. Due to a positioning screw 22 and a second resetting spring 23 acting against the screw 22 the ruler 21 can be displaced in its longitudinal direction. Due to rounded slide bearings 16 and 21a respectively, at the ends of the rulers 15 and 21 these rulers slide on the wedges 24, 25 on the ruler 14 mentioned before, and thus the sliding ruler 21 is also displaced in the Y-direction, normal to its longitudinal direction, and is thereby displaced in the Y-direction also to the fixture 1 which is pressed against the sliding ruler 21.

The precision positioning of the fixture 1 in the X-direction in relation to the work table is obtained with a lever 26 against which the fixture is pressed by the counter spring 12. The lever 26 is pivoting about a pivot 27 fixed to the work table and controlled by a third positioning screw 28. The second lever is arranged for shorter movement at the fixture than at the third positioning screw.

The precision positioning of the fixture is shortly as follows: an inductive transducer known per se cooperating with a spindle is placed for a first measurement in a corner of the fixture at a point designated with A and for a second measurement in a second corner of the fixture at a point designated with B. In relation to the work table both points should have the same Y-coordinate. If this is not the case the fixture is precision positioned in rotation with the first positioning screw 18. Then the fixture is precision positioned to the desired position in the Y-direction with the second positioning screw 22 and in X-direction with the third positioning screw 28.

A developement of the fixture with the effect that the influence of temperature changes on the positions of the work pieces is descreased and the time interval between the precision positionings is increased, consists in that the pressure spring 2 at the fastening screw which is situated closest to the pivot axis 15 of the pivoting ruler is replaced with a stiff sleeve, so that when the fastening screw in the sleeve after precision positioning is tightened, the part of the fixture situated under te sleeve becomes fixed to the work table. Dimension changes of the fixture owing to changes in the temperature are in this manner prevented to displace the fixture as a whole.

The fixture described here is applicable on other fixings and precision positioning purposes than those which occur in drilling machines and in other machine tools.

We claim:

1. A device for precision positioning of work pieces on the work table of a machine tool, said device comprising in combination:
a fixture in the form of a substantially rectangular plate disposed parallel to the work table and rotatable and displaceable relative thereto in two non-linear directions; first spring means pressing the fixture against said work table; a bar disposed adjacent to one edge of said fixture parallel thereto and pivotal about one end; second spring means disposed at the edge of the fixture opposite to said one edge and biasing the fixture toward said bar for displacement of the fixture in one direction; a two-arm first lever, one arm being parallel to another edge of the fixture and the other arm underlying said bar for pressure coaction therewith in opposition to the second spring means, said first lever being pivotal about a point intermediate the two arms; and a first positioning means coacting with said one arm of the first lever for pivoting the other arm into pressure coaction with said bar for selectively pivoting the same thereby rotating the fixture against the action of the second spring means.

2. The device according to claim 1 and comprising a second bar interposed between the first bar and said one edge of the fixture, said second bar being lengthwise slidable relative to said first bar and said one edge of the fixture, said first bar having at the ends of its side facing the second bar slanted surfaces and said second bar having on the ends of its side facing the first bar protrusions engaging said slanted surfaces of the first bar, the opposite side of the second bar abutting against said one edge of the fixture whereby lengthwise displacement of the second bar relative to the first bar causes displacement of the fixture relative to the work table in one of said directions against the action of the second spring means; and a second positioning means coacting with one end of said second bar to effect selective lengthwise displacement thereof.

3. The device according to claim 2 and comprising third spring means coacting with said second bar at the other end thereof against the action of the second positioning means, and fourth spring means coacting with the first arm of the first lever against the action of the first positioning means.

4. The device according to claim 1 and comprising a second lever disposed adjacent to a third edge of said fixture, said second lever being pivotal about one end and engaging with one of its lengthwise sides said third edge of the fixture; a third positioning means on the second lever for selectively exerting pressure upon said third edge of the fixture, said pressure causing displacement of the fixture in the other of the two directions; and fourth spring means exerting pressure upon the fourth edge of the fixture against the action of the third positioning means.

* * * * *